United States Patent
Mak et al.

(10) Patent No.: US 8,925,002 B2
(45) Date of Patent: Dec. 30, 2014

(54) PACING AD SERVICE WITH ADJUSTABLE GRANULARITY

(71) Applicant: Hulu, LLC, Santa Monica, CA (US)

(72) Inventors: Wing Chit Mak, Los Angeles, CA (US); Tony T. Zhang, San Diego, CA (US)

(73) Assignee: Hulu, LLC, Santa Monica, CA (US)

(*) Notice: Subject to any disclaimer, the term of this patent is extended or adjusted under 35 U.S.C. 154(b) by 0 days.

(21) Appl. No.: 13/662,161

(22) Filed: Oct. 26, 2012

(65) Prior Publication Data

US 2014/0123173 A1    May 1, 2014

(51) Int. Cl.
| | | |
|---|---|---|
| H04N 7/10 | (2006.01) | |
| H04N 7/025 | (2006.01) | |
| H04N 21/234 | (2011.01) | |
| G06Q 30/02 | (2012.01) | |
| H04N 21/81 | (2011.01) | |

(52) U.S. Cl.
CPC ....... *H04N 21/812* (2013.01); *H04N 21/23424* (2013.01); *G06Q 30/0251* (2013.01); *G06Q 30/0241* (2013.01)
USPC .................... 725/32; 725/34; 725/35; 725/36

(58) Field of Classification Search
CPC .......... H04N 21/812; H04N 21/23424; G06Q 30/0241; G06Q 30/0251
USPC ...................................................... 725/32–36
See application file for complete search history.

(56) References Cited

U.S. PATENT DOCUMENTS

| | | | | |
|---|---|---|---|---|
| 7,072,863 | B1* | 7/2006 | Phillips et al. | 705/36 R |
| 7,606,684 | B1* | 10/2009 | Pierce | 703/2 |
| 2003/0171990 | A1* | 9/2003 | Rao et al. | 705/14 |
| 2005/0068525 | A1* | 3/2005 | Taverner et al. | 356/327 |
| 2006/0253327 | A1* | 11/2006 | Morris et al. | 705/14 |
| 2007/0067211 | A1* | 3/2007 | Kaplan et al. | 705/10 |
| 2010/0269133 | A1* | 10/2010 | Ball | 725/32 |
| 2012/0272265 | A1* | 10/2012 | Flatt et al. | 725/34 |

* cited by examiner

*Primary Examiner* — Jeremy Duffield
(74) *Attorney, Agent, or Firm* — Fountainhead Law Group PC

(57) ABSTRACT

In a streaming video system with included video ad breaks, a pacing component allocates ads to particular ad breaks so as to pace the distribution of ads over a defined ad campaign period according to a pacing protocol using discrete time bins. A curve fitting algorithm may be used to provide increased or adjustable granularity of time bins used in the pacing protocol.

21 Claims, 10 Drawing Sheets

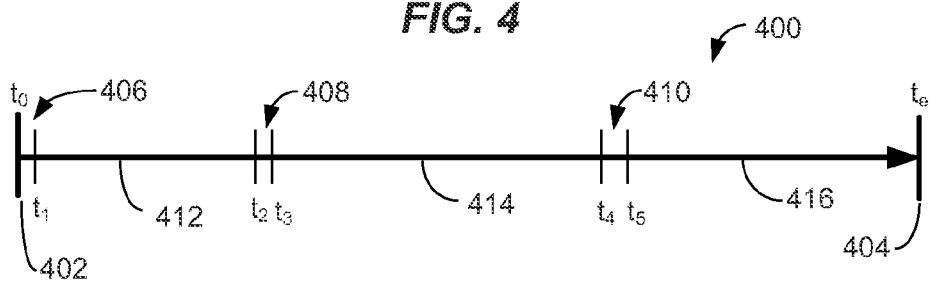
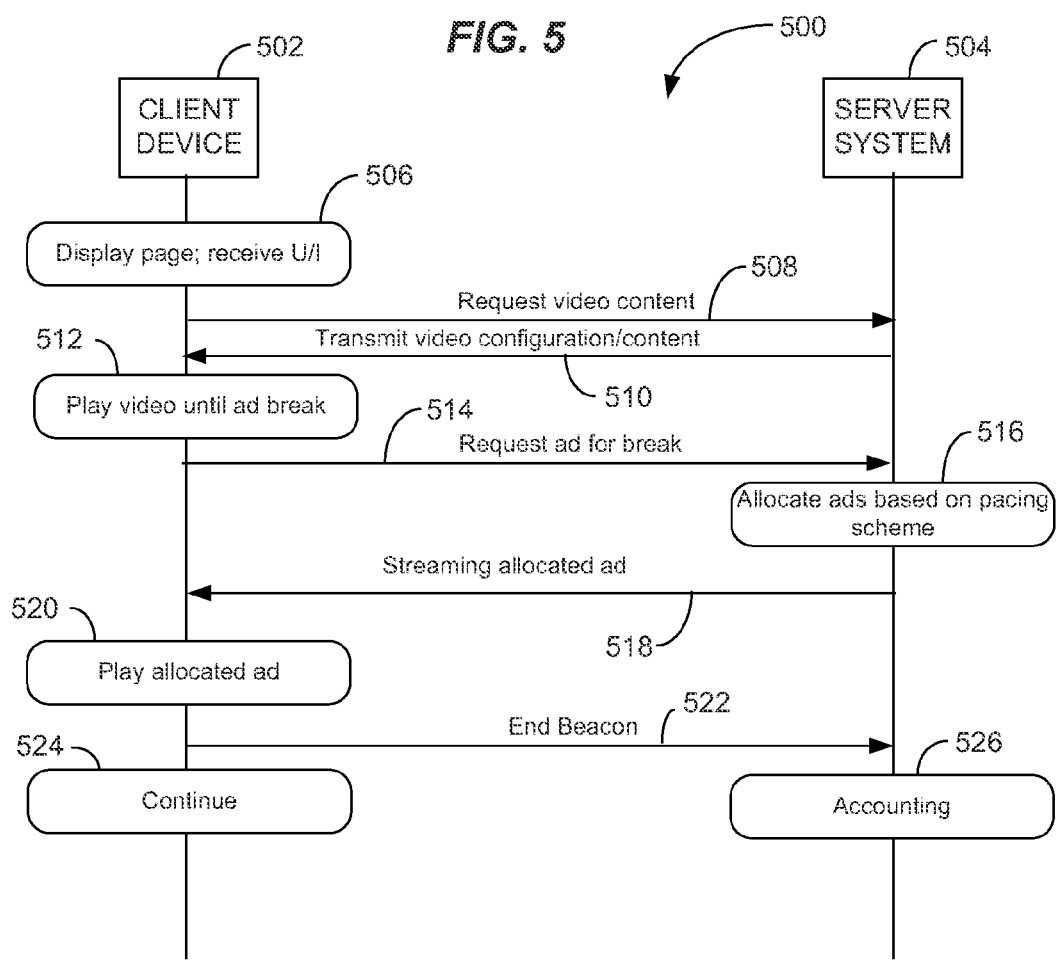

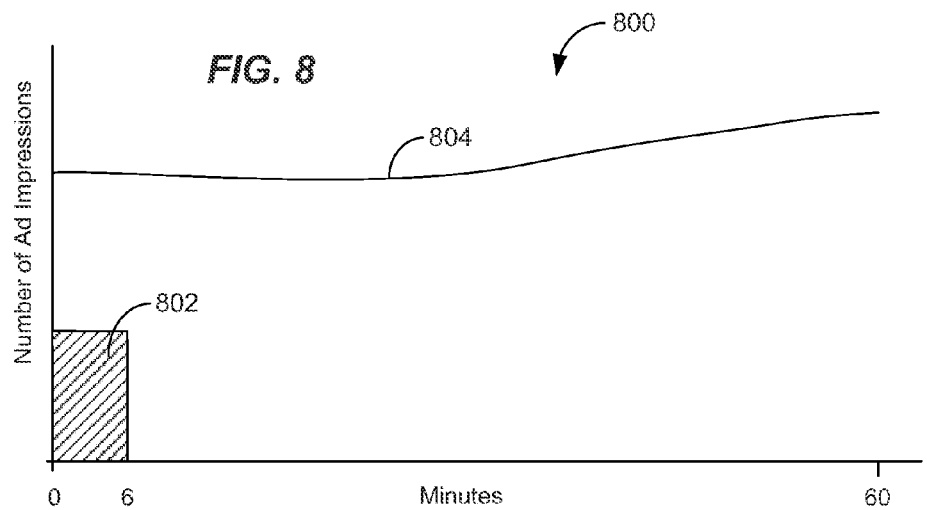
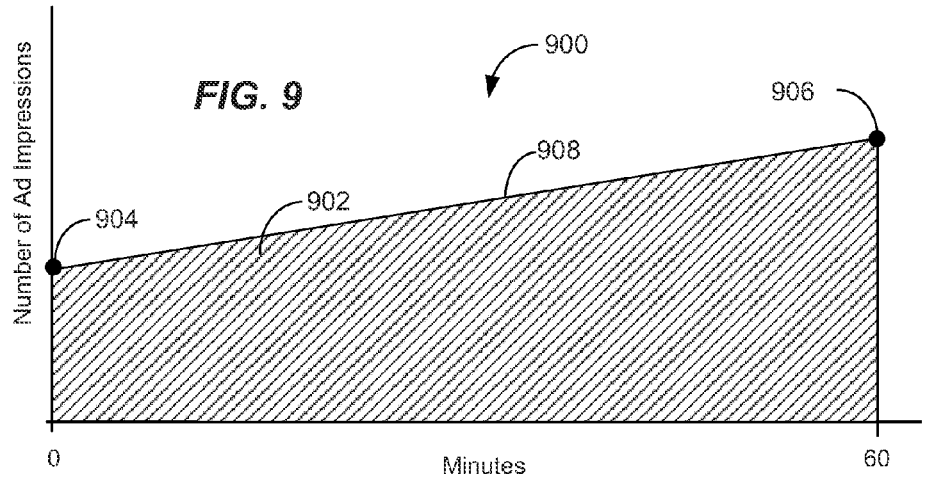
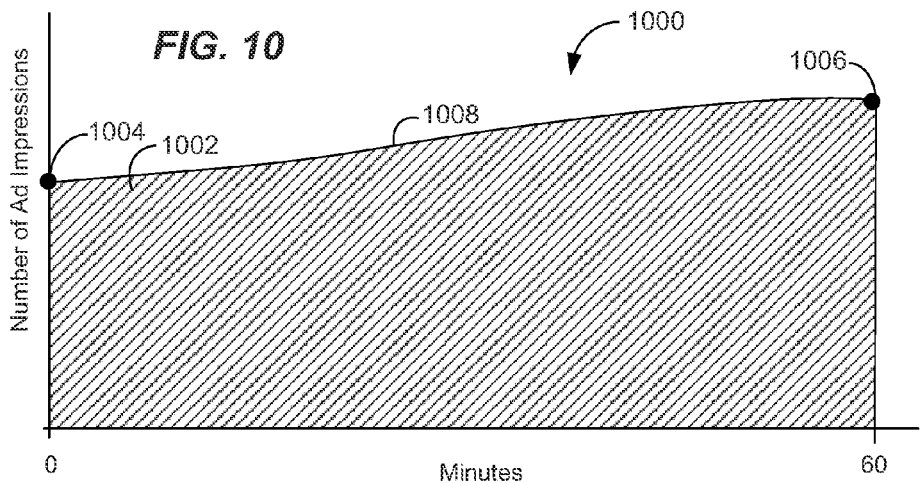

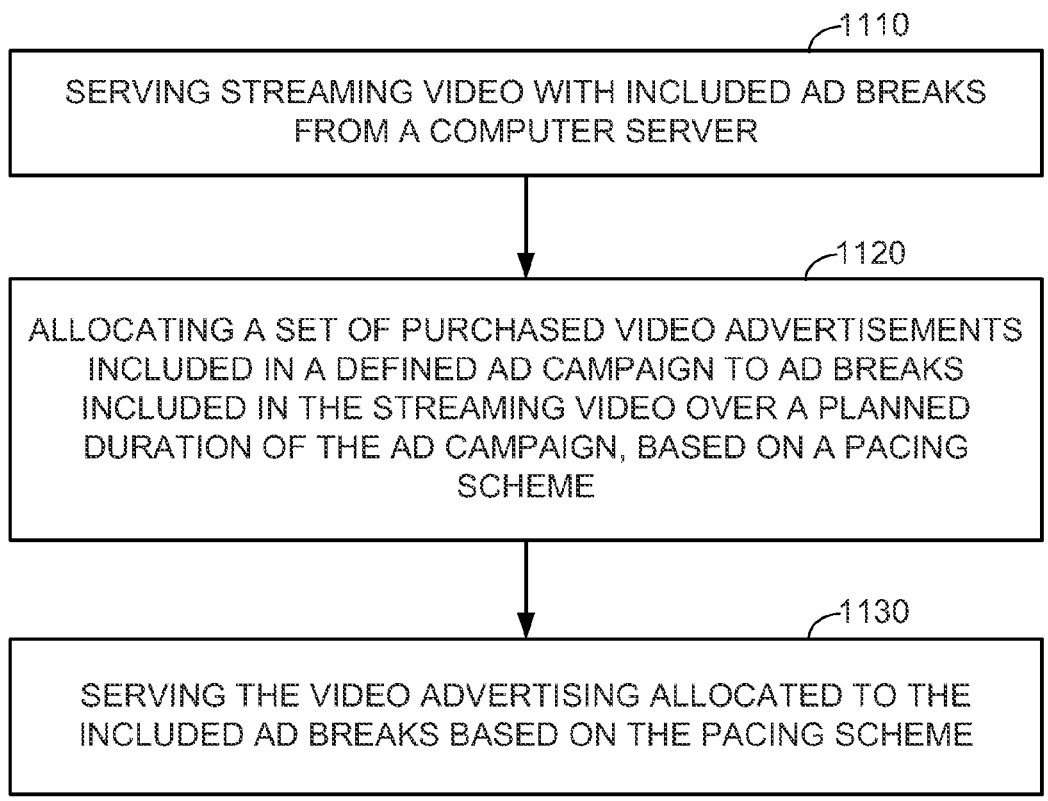

PACING AD SERVICE WITH ADJUSTABLE GRANULARITY

FIELD

The present application relates generally to input/output processing using a computer, and more particularly to pacing of video ads distributed in an online video system.

BACKGROUND

Advertising-supported distribution of audio-video data may be implemented from a content server to remote client devices over computer networks, telecommunications networks, and combinations of such networks, using various methods, for example progressive downloading or streaming. Platforms for such distribution may include sites that offer a great variety of different programming, including both newly released episodes of serial programs, major features, documentaries, special events, archives of past episodes and classic serial programs, of different types targeted to users having various different demographic profiles or located in different areas, and in various formats for use on different kinds of player devices. One or more video ads may be inserted into each video program and sold to advertisers who are charged based on how many times each advertisement is played on a client device; i.e., for each video ad impression.

Ad buyers may often purchase a block of ads, sometimes called ad impressions, for delivery in association with primary content of a video streaming service over a defined period of time. For example, an advertiser wishing to promote a "Spring Sale Event" may purchase a number of video ads to be run in advance of and during the promoted event. Such a block of ads may sometimes be referred to as an "ad campaign." The video streaming system then distributes the ads over the period of the ad campaign. For example, if 240,000 ads were purchased for an ad campaign to last ten days, the streaming system may distribute the ads at a constant rate of 240,000 ads/240 hours=1000 ads per hour. To stream the ads at this rate, at the beginning of each hour, the system may begin to include the purchased ads at appropriate locations in the streaming content, until all 1000 ads are delivered for the hour. For the remainder of each hour, no ads from the campaign may be delivered.

Consequently, prior methods of managing the pacing of video ads in a streaming video system may result in uneven distribution of ads with respect to time. These and other limitations of prior methods for managing the pacing of video ad delivery in an online video distribution system may be overcome by the novel methods and apparatus disclosed herein.

SUMMARY

Methods, apparatus and systems for managing the pacing of video ad delivery in an online video distribution system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for managing the pacing of video ad delivery in an online video distribution system may include serving streaming video with included ad breaks from a computer server. The method may further include allocating, by the server, a set of purchased video advertisements included in a defined ad campaign to ad breaks included in the streaming video over a planned duration of the ad campaign, based on a pacing scheme. The method may further include serving, from the server, the video advertising allocated to the included ad breaks based on the pacing scheme.

In more detailed aspects, the method may include dividing the duration of the ad campaign into a sequence of discrete time increments. The sequence of discrete time increments may be, or may include, a sequence of hour increments. The method may further include allocating an equal number of the video advertisements to each of the discrete time increments.

In other aspects, the method may include calculating a projected total viewership number for each of the discrete time increments, using the computer server or a connected server. For example, the method may include allocating a variable number of the video advertisements to each of the discrete time increments in proportion to the projected total viewership number for each of the discrete time increments.

In a related aspect, the method may further include subdividing the discrete time increments into subdivisions, using the computer server or a connected server. In such cases, the method may include allocating a variable number of the video advertisements to each of the subdivisions in proportion to a rate of projected total viewership per unit time integrated over the each respective subdivision. The server may perform calculating a rate of projected total viewership per unit time by interpolating between total viewership numbers for adjoining ones of the discrete time increments. In alternative embodiments, the method may include calculating a rate of projected total viewership per unit time by fitting a curve to a sequence of actual and projected total viewership numbers comprising the total viewership numbers for each of the discrete time increments. The curve fitting operation may preferably be performed using a cubic spline. Alternative curve fitting functions may also be used, for example a trigonometric function. The method may include adjusting granularity of the subdivisions based on an anticipated number of available ad breaks per unit time.

In related aspects, a computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for managing the pacing of video ad delivery in an online video distribution system are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. Like element numerals may be used to indicate like elements appearing in one or more of the figures.

FIG. 4 is a line diagram illustrating aspects of a video program including ad breaks.

FIG. 5 is a sequence diagram illustrating an example of a call flow between system components in a sequence for managing the pacing of video ad delivery in an online video distribution system.

FIG. 8 is a diagram illustrating a front-loaded distribution of ads for a video ad campaign, relative to all other ads distributed by a system, over a one-hour period.

FIG. 9 is a diagram illustrating a distribution of ads for a video campaign over a one-hour period, based on a linear extrapolation between a measured ad rate and a projected ad rate.

FIG. 10 is a diagram illustrating a distribution of ads for a video campaign over a one-hour period, based on fitting a curve between a plural measured ad rates and at least one projected ad rate.

FIGS. 11-14 are diagrams illustrating operations that may be performed by a computer server for managing the pacing of video ad delivery in an online video distribution system.

DETAILED DESCRIPTION

In the following description, for purposes of explanation, numerous specific details are set forth in order to provide a thorough understanding of one or more embodiments. It may be evident, however, that such embodiments may be practiced without these specific details. In other instances, structures and devices are shown in block diagram form in order to facilitate describing one or more embodiments.

Figure 1:
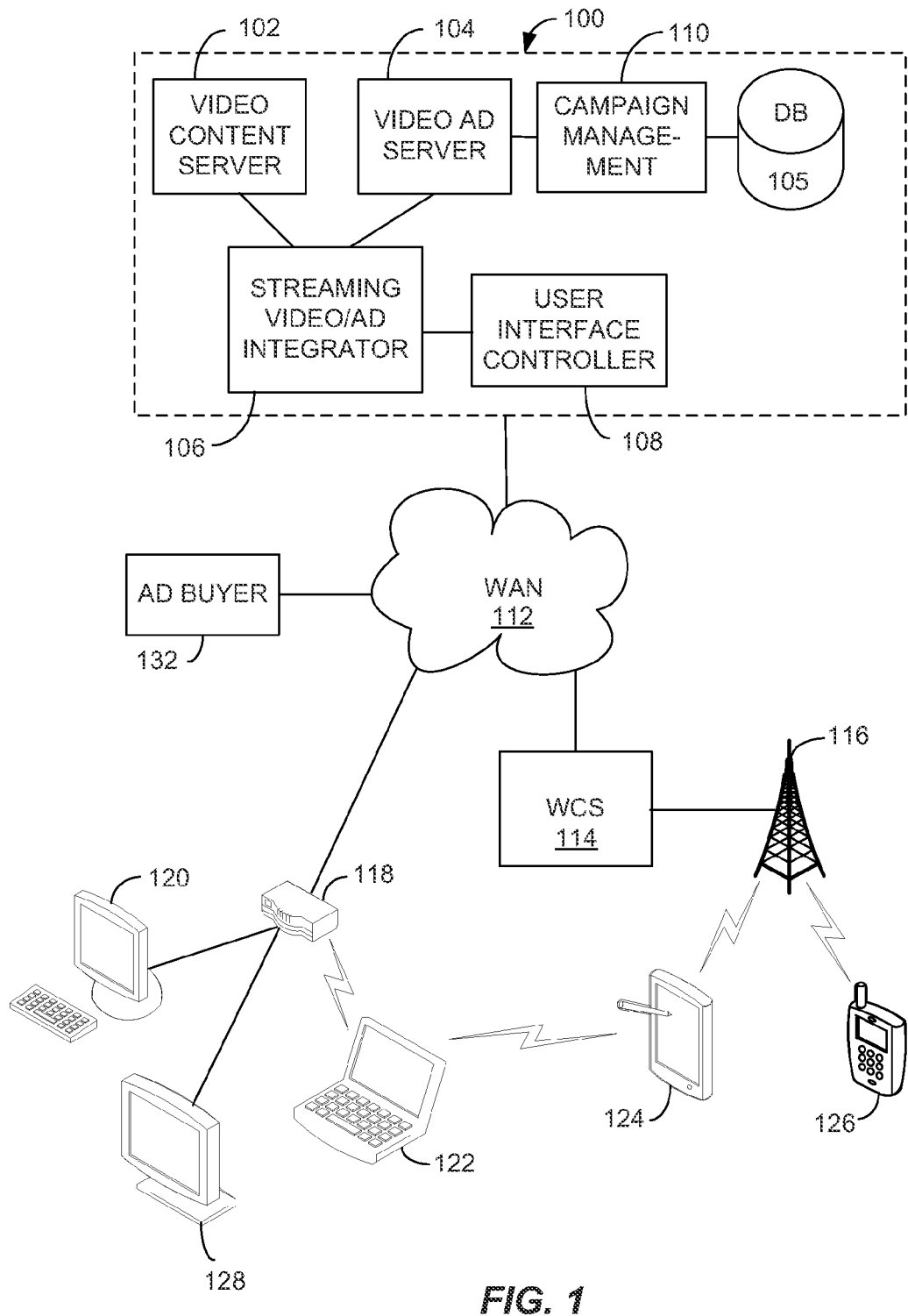
FIG. 1 is a schematic diagram illustrating an embodiment of a computing environment in which systems and methods discussed herein may be implemented.

Referring to FIG. 1, features and aspects as disclosed herein may be implemented within a video streaming system 100 in communication with multiple client devices via one or more communication networks.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Streaming may enable immediate playback at any point within the file. End-users may skip through the media file to start playback or change playback to any point in the media file. Unlike progressive downloading, which may require downloading the entire file or downloading enough of the entire file to start playback at the beginning, the end-user does not need to wait for the file to download in a predetermined sequence. Typically, streaming media is delivered from a few dedicated servers having high bandwidth capabilities.

A streaming media server 100 may be defined as a specialized device that accepts requests for video files, and based on information about the format, bandwidth and structure of those files, serves an amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages may include commands for enabling control functions such as fast forward, fast reverse, pausing, or seeking to a particular part of the file at the client. Since a streaming media server may transmit video data only as needed and at the rate that is needed, precise control over the number of streams served can be maintained. Streaming media servers may also enable monitoring and tracking of who is viewing what video programs and how long they are watched. In a streaming system, a media player component on the client device may be configured track use of the content and disable capture or storage of the streamed content, to prevent or discourage unauthorized copying.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

The delivery of video content by streaming or progressive download may be accomplished under a variety of models. In one model, the user pays for the viewing of each video program, for example, using a pay-per-view service. In another model, sponsors pay for the presentation of the media program in exchange for the right to present advertisements during or adjacent to the presentation of the program. In some models, advertisements are inserted at predetermined times in a video program, which times may be referred to as "ad breaks." An ad break reserved for one or more video ads to be played in uninterrupted sequence may also be referred to as an "ad pod." With streaming video, the media player may be configured so that the client device cannot play the video without also playing predetermined advertisements during the designated ad breaks.

For example, the video streaming system 100 may include one or more computer servers or modules 102, 104, 106, 108 and/or 110 distributed over one or more computers. Each server or module 102, 104, 106 and 110 may include, or may be operatively coupled to, one or more data stores, for example database 105, indexes, files, or other data structures. A video content server 102 may access a data store of various video segments; for example, newly released and archived television episodes, motion pictures, and other content produced as primary content of interest to consumers. The video content server 102 may provide video programs to the video/ad integrator 106 in response to user requests handled by a user interface controller module 108.

A video advertising server 104 may access a data store of relatively short video segments (e.g., 10 second, 30 second, or 60 second video advertisements) configured as advertising for a particular advertiser or message. The advertising may be provided for an advertiser in exchange for payment of same kind, or may comprise a promotional message for the system 100, a public service message, or some other information. The ad server 104 may serve the video advertising segments to the video/ad integrator 106 based on an ad selection algorithm, and may coordinate ad selection for video programs with an ad campaign management module 110.

The ad campaign management module 110 may communicate with the ad server 104 to control the pacing of advertising served by the system 100. For example, to keep the pacing of ad delivery for a campaign on track with a desired pacing algorithm, the ad campaign management module 110 may compare a desired pace of delivery determined by a pacing algorithm to an actual pace of delivery as determined from ad delivery records. If the actual pace is less than the desired pace, the ad campaign management module 110 may signal the ad server 104 to increase the frequency at which ads in the campaign are selected for delivery. If the actual pace is greater than the desired pace, the ad campaign management module 110 may signal the ad server 104 to decrease the frequency at which ads in the campaign are selected for delivery. The "pace" of ad delivery, as used herein, refers to the number of video ads delivered by the system 100 per unit time, and "pacing" means the control of pace.

An ad tracking server (not shown) may keep track of program and advertising views for video content streamed from the system 100 to client devices. Client devices may be configured to transmit a first signal, sometimes referred to as a "start beacon" to the system 100 (e.g., to ad tracker 110) at the onset of each video segment playing on the client. Similarly, the client may transmit a second signal, sometime called an "end beacon" to the system when a video segment has finished playing on the client device. The ad tracking server may process start and end beacons for video ads received by the system 100, together with information concerning the program and user profiles which with each beacon is associated, to develop records regarding video advertising views related to program type, program identifier, user demographic, location of client device or user account, player device type, and other associated information. The ad tracking server may store these records in a data structure, for example in a relational database 105.

The ad campaign management module 110 may use tracking records in the database 105 to discover information useful for pacing the delivery of ads from the system 100. Such information may include, for example, records of ads delivered and attributes associated with each ad delivered. From records of past ads delivered, the ad campaign management module 110 may determine a current pace and/or past pace of delivery for ads in the campaign and other ads delivered by the system 100. In addition, the ad campaign management module 110 may project past delivery patterns into future time periods to obtain estimates of future ad paces. The pace of ad deliveries in the future is determined by demand from users. It may be predictable based on past use patterns, but is not controlled by the streaming system 100.

Estimates of the future pace of ad delivery may be related to ad inventory estimated to be available in the system. As understood in the art and as used herein, "ad inventory" refers to a quantity of future ad impressions estimated to be available in a streaming video system during some defined future time period. Estimations may be based on a current state of the system, historical data regarding ad impressions, and/or other parameters. Ad inventory may be restricted to and thereby partly defined by a targeted audience based on selected demographic, geographic, or other targeted parameters. For example, ad inventory may be estimated for video programs targeted to a particular geographic region, user demographic, program genre, program assumed viewer profile, data format, client type, time-of-day, or any other attribute useful for targeting advertising.

In some embodiments, when an ad server detects an ad opportunity by receiving an ad request from a client device, the server may apply all applicable targeting rules from all ads within the system to determine the set of ads that can potentially be served for this single opportunity. This resulting set of ads may be referred to as the set of qualifying ads for the ad opportunity or request. Only one of the qualifying ads will be chosen to satisfy the client ad request. However, from the perspective of each of the qualifying ads, the ad request with other requests for which each ad qualifies within a designated period of time represent the potential ad opportunities within that period. In other words, the set of ad requests for which the respective one of the qualifying ads qualifies represents a measurement of available inventory for the ad. Such inventory data may be collected for defined time periods, for example, hourly. In the alternative, or in addition, estimation of ad inventory may be performed using other suitable methods, for example, methods as described in the co-pending applications U.S. Ser. No. 13/622,946 filed Sep. 19, 2012 ("Ad Inventory Management System") or U.S. Ser. No. 13/622,984 filed Sep. 19, 2012 ("Estimating Unique Impressions In An Online Video Ditribution System"). An ad campaign may specify desired attributes as a way to target ads in the campaign to people who are believed to be more likely to be positively influenced by the campaign.

The video streaming system 100 may further include an integrator component 106 that integrates video content and video advertising into a streaming video segment as directed by the controller 108. The integrator component 106 may stream information including primary video content and selected advertising to individual client devices involved in streaming systems with system 100. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 112 and/or other network 114. Such client devices may include, for example, one or more laptop computers 122, desktop computers 120, "smart" mobile phones 126, notepad devices 124, network-enabled televisions 128, or combinations thereof. Each of the client devices may be communicatively coupled to the video streaming system 100 via a router 118 for a LAN, via a base station 116 for a wireless telephony network 114, or via some other connection or combination of connections. In operation, such client devices 120, 122, 124, 126, 128 may send and receive data or instructions to the system 100, in response to user input received from user input devices or other input. In response, the system 100 may serve video program segments and selected video advertising content to the client devices 120, 122, 124, 126, 128. The devices 120, 122, 124, 126, 128 may output video content from the streaming video programs and video advertising segments using a display screen, projector, or other video output device. In certain embodiments, the system 100 configured in accordance with the features and aspects disclosed herein may be configured to operate within or support a cloud computing environment. For example, a portion of, or all of, the servers 102, 104 or 110 may reside in a cloud server.

Figure 2:
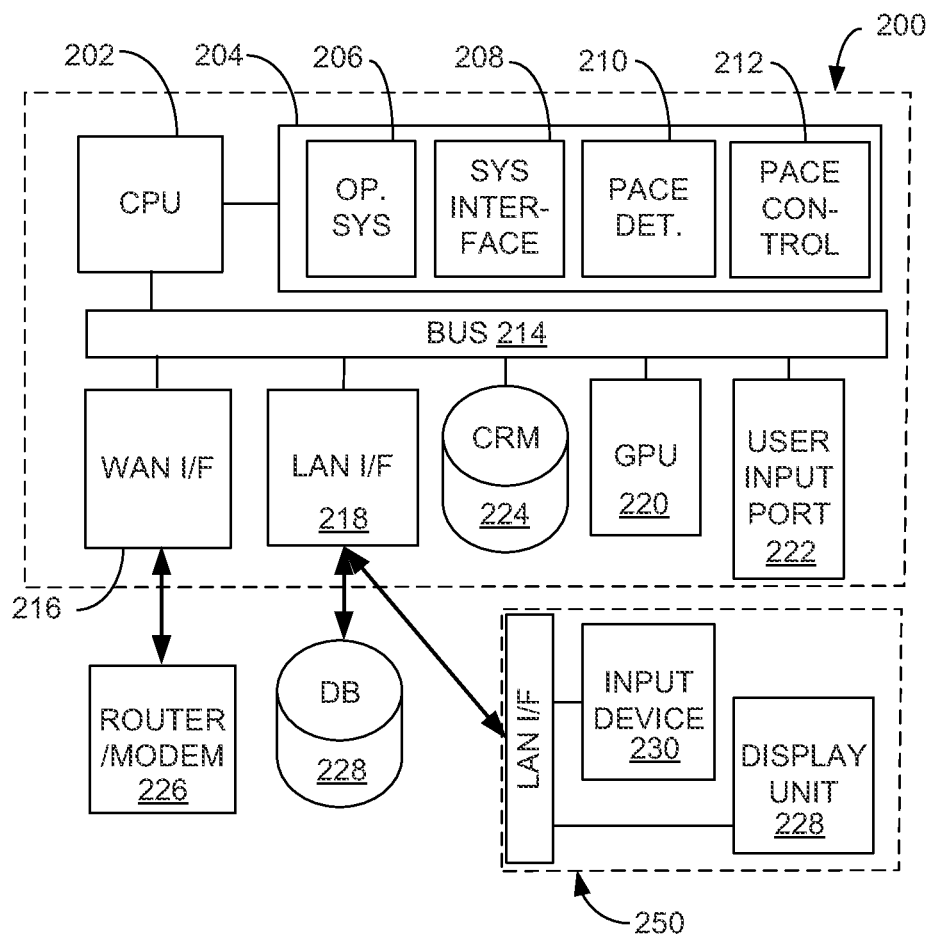
FIG. 2 is a schematic block diagram illustrating an embodiment of a network computing device for supporting and executing the systems and methods described herein.

Referring to FIG. 2, a diagrammatic view of an example ad pacing management server 200 is illustrated. For example, the module 110 shown in FIG. 1 may be configured as or include such ad pacing management server 200, which may also be referred to as a computer, server, or computer server. In selected embodiments, the ad pacing management server 200 may include a processor 202 operatively coupled to a processor memory 204, which holds binary-coded functional modules for execution by the processor 202. Such functional modules may include an operating system 206 for handling system functions such as input/output and memory access, a system interface 208 for communicating other components of the system 100, a pace determination module 210 for determining a desired pace for an ad campaign, and a pace control module 212 for adjusting the pace of ad distribution to conform to a desired pace, for example signaling information to an ad server. The ad pacing management server may be implemented as a component of an ad server 104 or other part of system 100.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, and 210 when the ad pacing management server 200 is powered off, from which the modules may be loaded into the processor memory 204 when the server 200 is powered up. The storage device 224 may include a non-transitory computer-readable medium holding information, instructions, or some combination thereof, for example instructions that when executed by the processor 202, cause the ad pacing management server 200 to perform one or more operations of a method as described herein.

A communication interface 216 may also be connected to the bus 214. The communication interface 216 may provide or support two-way data communication between the ad pacing management server 200 and one or components of the streaming system 100, optionally via a router/modem 226 or other connection. In the alternative, or in addition, the ad pacing management server 200 may include a Local Area Network (LAN) interface 218 communicatively coupled to a database server 228, from which the server 200 may obtain information regarding ad inventory and historical ad view data categorized by any useful targeted attribute, for processing to measure a pace of ad delivery and estimate ad pace for future time periods.

The ad pacing management server 200 may be connected (e.g., via the graphics processing unit 220, input port 222 and LAN interface 218) to a terminal 250 enabling an administrative user to interact with the server 200. However, in other embodiments, or at most times during operation, the server 200 may operate automatically without requiring direct user input. Instead, the server 200 may receive input via other components of the system 100.

When present, the terminal 250 may include a display component 228. A display component 228 may include any suitable configuration for displaying information to a user of the ad pacing management server 200. For example, a display component 228 may include or utilize a liquid crystal display (LCD), touchscreen LCD (e.g., capacitive display), light emitting diode (LED) display, projector, cathode ray tube (CRT), or other display device to present information to a user of the ad pacing management server 200 in a visual display.

One or more input devices 230 (e.g., an alphanumeric keyboard, microphone, keypad, remote controller, touchscreen, camera or camera array) in the terminal 250 may be connected to the bus 214 via a user input port 222 and LAN interface 218 to communicate information and commands to the server 200. In selected embodiments, an input device 230 may provide or support control over user selection input, for example, control of a cursor or highlight. Such a selection indicator control device, for example a pointing device, may be configured as a mouse, a trackball, a track pad, touchscreen, cursor direction keys or other device for receiving or tracking physical movement and translating the movement into electrical signals indicating movement of a user selection indicator. The selection indicator control device may be incorporated into the display unit 228, for example using a touch sensitive screen. A selection indicator control device may communicate direction information and command selections to the processor 202 and control selection indicator movement on the display 228.

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

Figure 3:
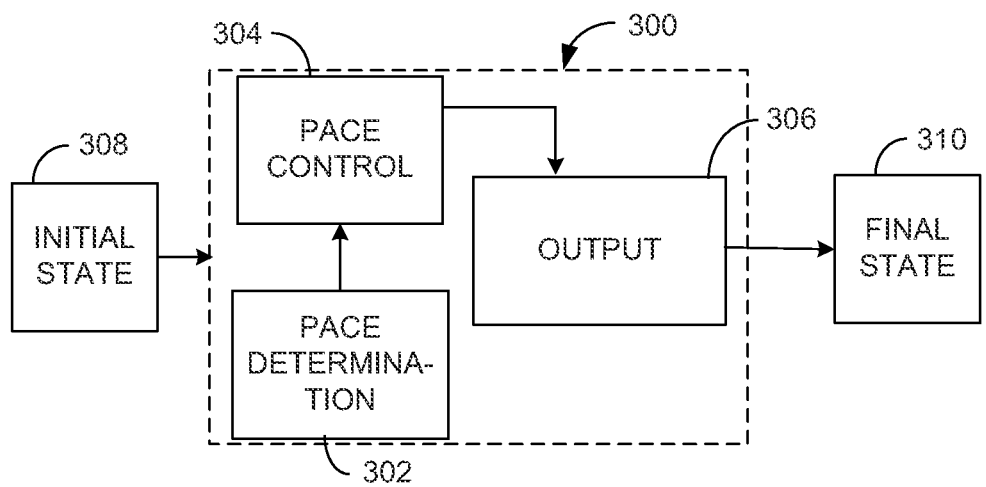
FIG. 3 is a state diagram illustrating general aspects of managing the pacing of video ad delivery in an online video distribution system.

Referring to FIG. 3, general aspects of an ad pacing management process 300 used for transforming parameters of an ad pacing process for ad inventory of an online streaming video system are illustrated as a state diagram. The pacing management process 300 may include an input-output computation process performed by a computer processor, which operates on the initial state 308 to output the final state 310.

The initial state 308 may represent data defining an ad campaign for delivery in a video streaming system, including an undefined (null) pacing scheme or a default pacing scheme. It should be appreciated that the pacing process 300 may include a physical transformation of machine states, in which the initial state is transformed into a final data state 310 that maps to a specific physical output state of a video streaming system. The specific physical output may include physical output of the ads in an ad campaign from a set of client devices, in a temporal pattern defined by a pacing scheme determined and implemented by the pacing process 300.

The ad pacing management process 300 may include several interactive modules, for example, a pace determination module 302, a pace control module 302 and an output module 306. The process 300 may include other modules, for example, a system interface module, user interface module, graphics module, etc., which for illustrative simplicity are not shown.

The pace determination module 302 may determine a pacing scheme for an ad campaign in a video streaming system. The pacing scheme may be designed to evenly distribute streaming of the video ads over the time period defined for the ad campaign. The defined time period may be continuous or discontinuous. For example, a continuous period may include any number of consecutive 24-hour days. A discontinuous period may include a period including at least one gap, for example, periods including times during which ads are not to be distributed, based on time of day, day of week, and so forth. Pace determination may include algorithms as described herein to distribute streaming of ads evenly, or in some defined pattern, over the ad campaign period.

The pace control module 304 may implement the pacing control scheme defined by the pace determination module 302. Pace control may be implemented using a feedback control loop to increase or decrease the rate at which the streaming service streams ads in the campaign, to conform to the pacing scheme. The pace control module 304 may also communicate with the pace determination module 302 to adjust the pacing scheme, if necessary, to conform to changing conditions of the video streaming system.

The output module 306 may provide a data signal encoding control signals from the pace control module 304 to an ad streaming component of the video streaming service. In response to the control signals from the output module 306, the video streaming system streams ads in the campaign to multiple client devices in the temporal pattern defined by the pacing control signals. The client devices receiving the steaming ads process the streaming data, causing output of video ads according to the pace defined by process 300, realizing the final state 310.

Pace determination and pace control may be adapted in the context of video streaming systems that insert video ads in program content. FIG. 4 is a line diagram illustrating aspects of a video segment timeline 400 including an example of a pattern including ad breaks 406, 408 and 410. A video segment includes video data characterized by a sequence of video frames that are output in order at a defined frame rate to generate video output. As such, a video segment includes an initial or first frame at inception time "$t_0$" 402 of video output, and each subsequent frame is output at a defined time "t" after inception until a terminal or end time "$t_e$" 404. Thus, each frame defines a particular time in the streaming video segment, typically measured from the time of inception. For example, for a video configured for 30 frames per second, the $300^{th}$ frame defines a time 10 seconds after inception. A time point in a streaming video segment may sometime be referred to herein as a "location" in relation to a progress bar, time line or other time indicator.

Any non-negative, integral number of ad breaks 406, 408 and 410 may be configured in the video time line. Each ad break may be defined by a location and duration. For example, the first ad break 406 is located at "$t_0$" and has a duration of "$t_1-t_0$"; the second ad break 408 is located at "$t_2$" and has a duration of "$t_3-t_2$"; and the third ad break 410 is located at "$t_4$" and has a duration of "$t_5-t_4$". The inter-break portions 412, 414 and 416 are used for playing requesting video content, and the ad breaks are used for playing video advertisements. A streaming media player operating on the client device may cause the video content to play in the defined inter-slot portions 412, 414, 416 and stream advertising videos of appropriate duration in all of the ad breaks 406, 408, 410.

FIG. 5 illustrates an example of a call flow 500 between a server system 504 and a client device 502 for managing the pacing of video ad delivery in an online video distribution system. The call flow 500 assumes video streaming is provided through a web page interface and streaming media player installed at the client device; however, the inventive concepts herein are not limited to such environments. If a web page environment is used, a call flow may initiate, at 506, with the client device 502 displaying a web (e.g., World Wide Web) page received from the server system 504 including links for requesting one or more video segments. For example, the web page may comprise a "home" or personalized page including a list of selected video segments of general interest, or selected as likely to be of interest to a specific user based on a user profile. The client device may receive 506 user input selecting one of the links, for example, a "point and click" input from a pointing device, a touch input on a touchscreen device, or a spoken command. In response to the input, the client device may request a specific video segment 508 by transmitting a Hypertext Transfer Protocol (HTTP) "get" request, or other suitable request message, to the server system 504. The server may retrieve and/or create configuration data for a streaming session, retrieve the content data from a data store, and at 510, provide the configuration data and streaming content data to the client device 502. It should be appreciated that the client 502 may play the streaming content 512 as it is received, so to a certain extent the operations 510 and 512 may occur contemporaneously.

While playing the streaming video, the client 502 may detect that a defined ad break is about to occur (for example, in 1, 2 or 3 seconds from a current frame). In response to detecting the incipient ad break, the client 502 may, at 514, request one or more ads for the break by signaling to the server 504. In response to receiving the request message 514, the server system 504 may, at 516, determine a selection of advertising videos for the video segment identified by the request message, including allocating ads based on a pace control scheme. In so doing, the server system may access a record pertaining to user preferences or past activity by a user identified, for example by a user account, as making the request for the video segment. Any suitable method may be used to select an initial set of default advertisements. Allocation of ads according to the pacing scheme may feed into the ad selection process in various ways. For example, a pacing control module may switch eligibility of an ad for being selected between "eligible" and "ineligible" states to control the rate at which the server selects ads in the campaign in response to specific ad requests. In the alternative, or in addition, the control module may adjust the weighting of a selection factor to control the rate at which the server system selects an associated ad.

An ad server of the video streaming system may, at 518, serve the selected video ad to the client 502 in response to each request. In alternative embodiments, an ad server may automatically select and include a streaming video ad in the content streamed to the client device, without responding to a request from the client for a video ad. In that case, the ad selection and pacing may be performed in advance of the receiving an ad request. Either way, the client 502 plays the allocated ad 520 when received. When each client has finished playing an ad, it may transmit an end beacon 522 to the ad server 504, indicating that play of the allocated ad is completed at the client. The server 504 may use the signal to trigger an accounting function 526 for advertising commerce, ad tracking, and similar purposes. Meanwhile, at 524, the client device 502 may continue to play the streaming video content until the next ad break is reached or the video content is completed or terminated by the user.

Figure 6:
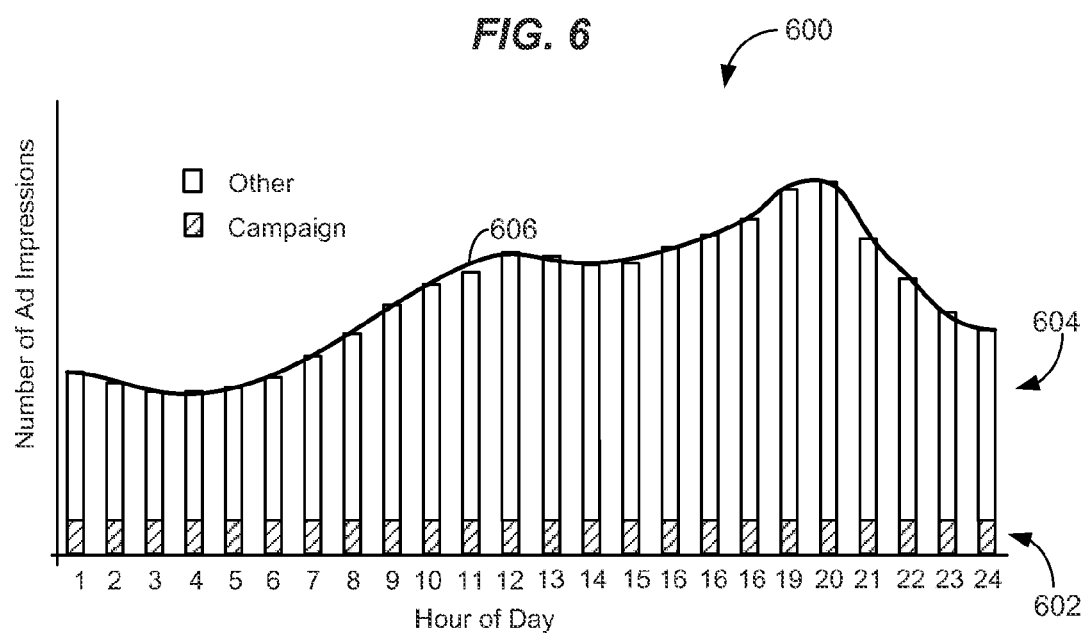
FIG. 6 is a diagram illustrating a distribution of video ads for a particular campaign in relation to total ad views, in hourly increments over a 24-hour period.

Various pacing algorithms may be used by a video streaming system to define an ad pacing scheme. FIG. 6 illustrates a distribution 600 of video ads for a particular campaign in relation to total ad views, in hourly increments over a 24-hour period. Each of the vertical data bars 604 represents a number of ad impressions meeting a defined attribute set served by a video streaming service in one hour of a 24-hour period. The number of impressions in the hour may include every impression recorded by the video streaming system, or some lesser included subset of all the impressions, depending on the targeting attributes defined for an ad campaign. Therefore, the height of the data bars 604 represents the total number of ad impressions potentially available for the particular campaign, on an hourly basis. The data bars 604 are arranged in a sequence representing the sequence of hours in the 24-hour day.

The respective lower portions 602 of the data bars 604 represent the number of ad impressions allocated to the ad campaign in each hour. In the illustrated distribution 600, a constant-value allocation scheme is shown, wherein a constant number of ad impressions are allocated per hour. The allocation scheme illustrated by FIG. 6 may be symbolically represented by $N_h = K$, wherein '$N_h$' is the number of ad impressions per hour, and 'K' is a constant value. 'K' may be determined by dividing the number of total ad impressions in the ad campaign by the number of hours in the campaign period. It should be apparent that the number of campaign ads served may be greater than the number of ad impressions recorded, if the ad impression is not recorded until an end beacon or similar signal is received. The server system may compensate for this by continuing to serve ads in the campaign in each hour until the targeted number of ad impressions '$N_h$' is recorded.

The distribution 600 may therefore be represented as 24 discrete data points, represented by the data bars 604. The same information may be represented by a curve 606 representing a number of ad impressions recorded as a function of time. The curve 606 may be derived by any suitable curve-fitting technique, for example, ordinary or weighted least squares, probability distribution fitting, or smoothing. A resulting curve 606 may be a species of spline, for example, a cubic spline. Numerical methods are known for fitting a polynomial, spline, or other smooth curve to a set of data points, and any suitable method can be used. It should be apparent that the curve 606 as shown in FIG. 6 represents historical data, and not impressions over a future time period. However, in embodiments described below, a curve may include a portion fit to projected (estimated) data points representing future ad impressions.

Figure 7:
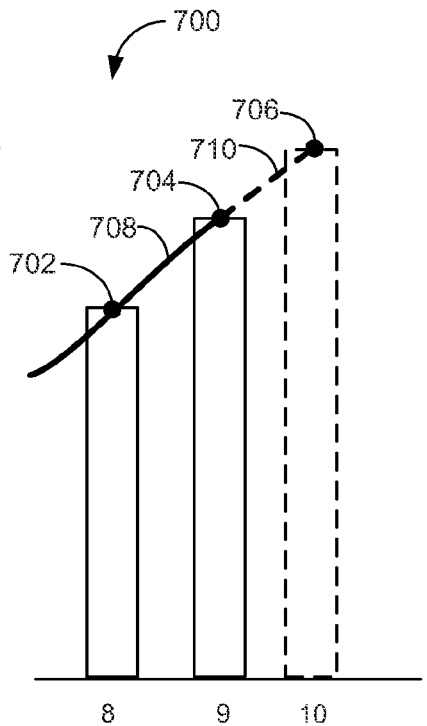
FIG. 7 is a detail view showing elements from the diagram of FIG. 6, to illustrate estimation of ad views as a function of time over a future time period.

FIG. 7 is a detail view showing elements from the diagram of FIG. 6, namely the data bars for hours 8 and 9 plus an estimated data bar for hour 10, to illustrate estimation of ad views as a function of time over a future time period. The number of each ad impressions in an hour is necessarily unknown before the hour has passed, because it is determined by input from connected client devices that are independently controlled by individual users, and not by the video streaming system. Therefore, for example, data points 702 and 704 represent known numbers of ad impressions recorded for past time periods, at a time when hours 9 and 10 are completed and hour 10 is not yet completed. The system may estimate ad impressions expected for future time periods, for example a data point 706 representing an estimated number of impressions in hour 10. A curve fit through the points 702, 704 and 706 may include an initial portion 708 representing historical data and a terminal portion 710 representing estimated data.

FIG. 6 illustrates allocation of video ads at an hour-level granularity. When ads are distributed based on hourly increments, distribution may be configured quite differently at lower levels of granularity such as per minute or per second. For example, FIG. 8 illustrates a front-loaded distribution 802 of ads for a video ad campaign, relative to all other ads distributed by a system, over a one-hour period diagrammed as 0 to 60 minutes on the horizontal axis of graph 800. The curve 804 represents a total number of impressions per unit time over the period. The area of the region 802 represents the total number ad impressions allocated to the illustrated hour, distributed at a constant rate represented by the horizontal upper boundary of the region 802 for a period of six minutes. The area of the region 802 may be determined by an integral of a function defining the upper boundary of the region 802 over the time period for which the function is not zero. In the example illustrated by FIG. 8, the function is a constant value.

In some embodiments, the upper boundary of the region 802 may be collinear with the curve 804, such as when the systems selects campaign ad for streaming at the maximum possible rate until all ad impressions allocated for the hour have been recorded. In many circumstances, anti-fatigue rules may prevent campaign ads from consuming every ad opportunity in a given time period, as illustrated in FIG. 8, where the upper bound of the region 802 is lower than the total impression line 804. Either way, using a front-loaded hourly distribution may result in large time gaps wherein no ads for the campaign are being served. One advantage of front-loading, however, is that the allocation module does not need to estimate (or obtain an estimate of) the number of ad impressions that will be recorded in the current uncompleted tracking interval (e.g., each of the hourly intervals of FIG. 6). Instead, the module may simply select campaign ads for streaming at the maximum rate starting at the beginning of each tracking interval, until all the campaign ads allocated for the interval have been served.

Various methods may be used to reduce time gaps. One approach may be to reduce the granularity of time divisions used for tracking ads. For example, instead of one-hour intervals, one minute intervals may be used. However, this approach may be computationally inefficient. Nor would it eliminate time gaps in streaming campaign ads; it would just subdivide and distribute time gaps at a finer level of granularity. Other methods may be more computationally efficient and may eliminate time gaps.

For example, FIGS. 9 and 10 illustrate distributions of ads over a one hour period without time gaps. Assuming the same total number of campaign ads as shown in FIG. 8, the vertical scale in FIGS. 9 and 10 although not drawn to a precise scale is magnified by roughly an order of magnitude related to the vertical scale of FIG. 8.

In an aspect, time gap elimination may include forecasting ad inventory for a future (i.e., next) time period or tracking interval. By tracking when and how many of targeted ad requests occur for each qualifying ad, an accurate measurement of the inventory trend over time may be developed. The system may use historical data concerning the inventory trend over time and use that the data to forecast the inventory trend in the future. It may be impractical to track all inventory data for extensive past time periods, because a system may accrue a high volume of historical data that may become difficult to manage efficiently. Therefore, based on a simplifying assumption that inventory trend follows a weekly (or other limited-period) pattern, the system may limit itself to using data collected for a limited past period, for example, for the latest calendar week or latest rolling seven-day period. As noted above, it may be impractical to track the inventory trends in fine granularity. Therefore, the ad server may aggregate inventory measurements at an hourly interval, which may limit the forecast inventory model used for pacing to hourly granularity. To overcome this limitation, the system may make estimates of the inventory trend within each hourly period, for example as described below in connection with FIGS. 9 and 10.

FIG. 9 illustrates a distribution 900 for a video campaign over a one-hour period, based on a linear extrapolation between a measured total ad impressions rate and a projected total ad impressions rate for the next hour increment. An initial rate of ad impressions 904 may be calculated based on the hourly ad impression rate for the most recently completed hour. For example, if '$N_t$' total impressions were recorded for the last hour, the initial selection rate for the ad campaign in the next hour (represented by the point 904 in FIG. 9) may be determined by '$N_h$' (total campaign ads allocated to the next hour) divided by the number of time subdivisions to be used for control of ad allocation in the period (e.g., $N_t = N_h/60$ minutes or $N_h/3600$ seconds).

A final ad rate for the illustrated hour represented by the final point 906 may be similarly based on a projected total ad impressions rate for the next hour increment. The projected ad impressions rate may be obtained in any suitable method, for example by adopting past data for similar time periods (e.g., same time-of-day and day-of-week), projecting a trend from data in the immediate past (e.g., a linear or non-linear projection from points 702 and 704 in FIG. 7 to point 706), or some combination of trend projection and data from similar time periods. Once the initial rate point 904 and final rate point 906 are determined, the system may determine a continuous straight line 908 between the points 904 and 906. The system may then control the rate of selecting campaign ads for streaming at the rate indicated by the line 908 for the adopted time subdivision (e.g., minutes or seconds).

The total area 902 represents the total number of campaign ads served in the hour, which, depending on the values selected for points 904 and 906, may be slightly more or less than the intended ad allocation $N_h$. If so, the ad allocation for the next hour may be adjusted upwards or downwards to compensate for any surplus or deficiency in allocation observed for the last hour period.

FIG. 10 illustrates an alternative distribution 1000 of ads for a video campaign over a one-hour period, based on fitting a curve between a plural measured ad rates and at least one projected ad rate. The plural measured ad impression rates may be for a trailing period, for example, the most recent 12 hourly periods plus an estimated number of hourly impressions for the next hour, or the most recent 24 hourly periods plus an estimate for the next hour or for each of the next two hours. Thus, a plural number of data points may be used to define a data curve using any suitable curve-fitting method, for example a cubic spline. Advantages of using a cubic spline curve fitting for intra-period estimating may include avoiding Runge's phenomenon of high degree polynomial interpolation and accounting for global trends (unlike a simple piecewise linear interpolation). Initial point 1004 may be computed in the same manner as point 904 in FIG. 9, and final point 1006 may be computer in the same manner as point 906, essentially by dividing the hourly measure or estimate by the desired scale factor (e.g., 60 or 3600). Then, a segment of the smooth curve derived by curve fitting to the selected and estimated data points between the most recent measure and the next period may be scaled by the same scale factor to fit to the points 1004 and 1006, resulting in the curve segment 1008. The system may then control the rate of selecting campaign ads for streaming at the rate indicated by the curve segment 1008 for the selected time scale. The area 1002 represents the total ad impressions to be recorded in the hour, which may be slightly more or less than a targeted allotment for the hour. Excesses or deficits in the allotment may be compensated by adjusting the next hour's allotment.

It should be apparent that the methodologies illustrated by FIGS. 8-10 may be implemented by a computer in various ways, without drawing any graphs or other graphical representations. The illustrated graphs are merely for purposes of illustration, and one of ordinary skill may implement the described methods using any suitable programming method.

The foregoing examples may be embodied in one or more methodologies performed by a computer, for example a computer server as shown in FIG. 2, or some combination of computer servers. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Example Methodologies and Apparatus

As shown in FIG. 11, a computer server system may perform a method 1100 for managing the pacing of video ad delivery in an online video distribution system. The method 1100 may include, at 1110, serving streaming video with included ad breaks from a computer server. For example, a component of an ad streaming system may perform more detailed operations for streaming video with ads, as described above in connection with FIGS. 4-5.

The method 1100 may further include, at 1120, allocating a set of purchased video advertisements included in a defined ad campaign to ad breaks included in the streaming video over a planned duration of the ad campaign, based on a pacing scheme. For example, the video streaming server or related component of the system may determine a number of ads from the ad campaign to be included in a current time interval, using a pace control algorithm as disclosed herein. Then, the server or component may include ads from the campaign in ads selected for streaming at a rate determined by the algorithmically-determined pace.

The method 1100 may further include, at 1130, serving the video advertising allocated to the included ad breaks based on the pacing scheme. For example, the server or component may, after selecting the campaign ads for ongoing video streaming sessions at 1120, stream the ads to respective clients in the streaming sessions, using a streaming technique as described in more detail elsewhere herein.

Figure 12:
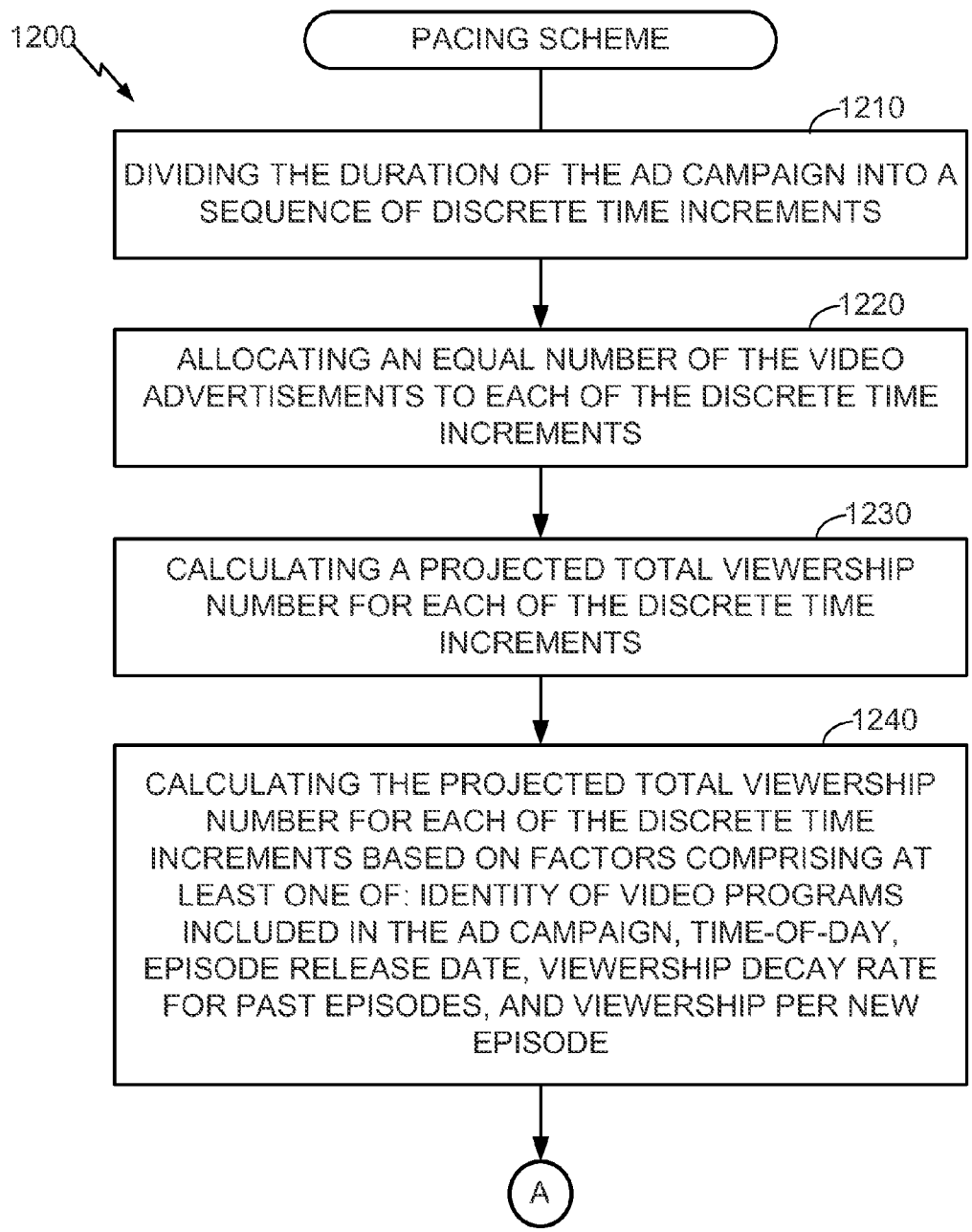
Figure 13:
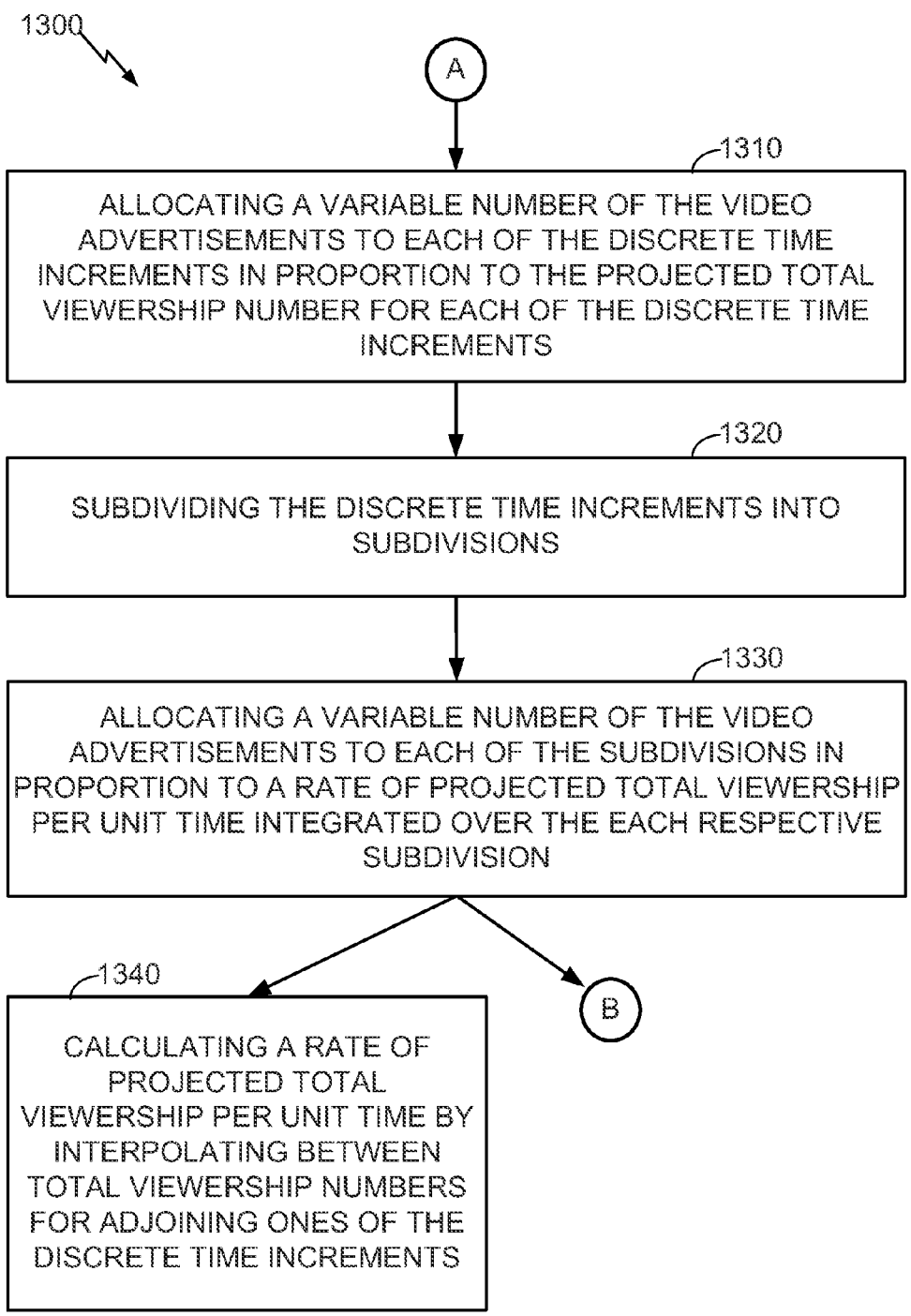
Figure 14:
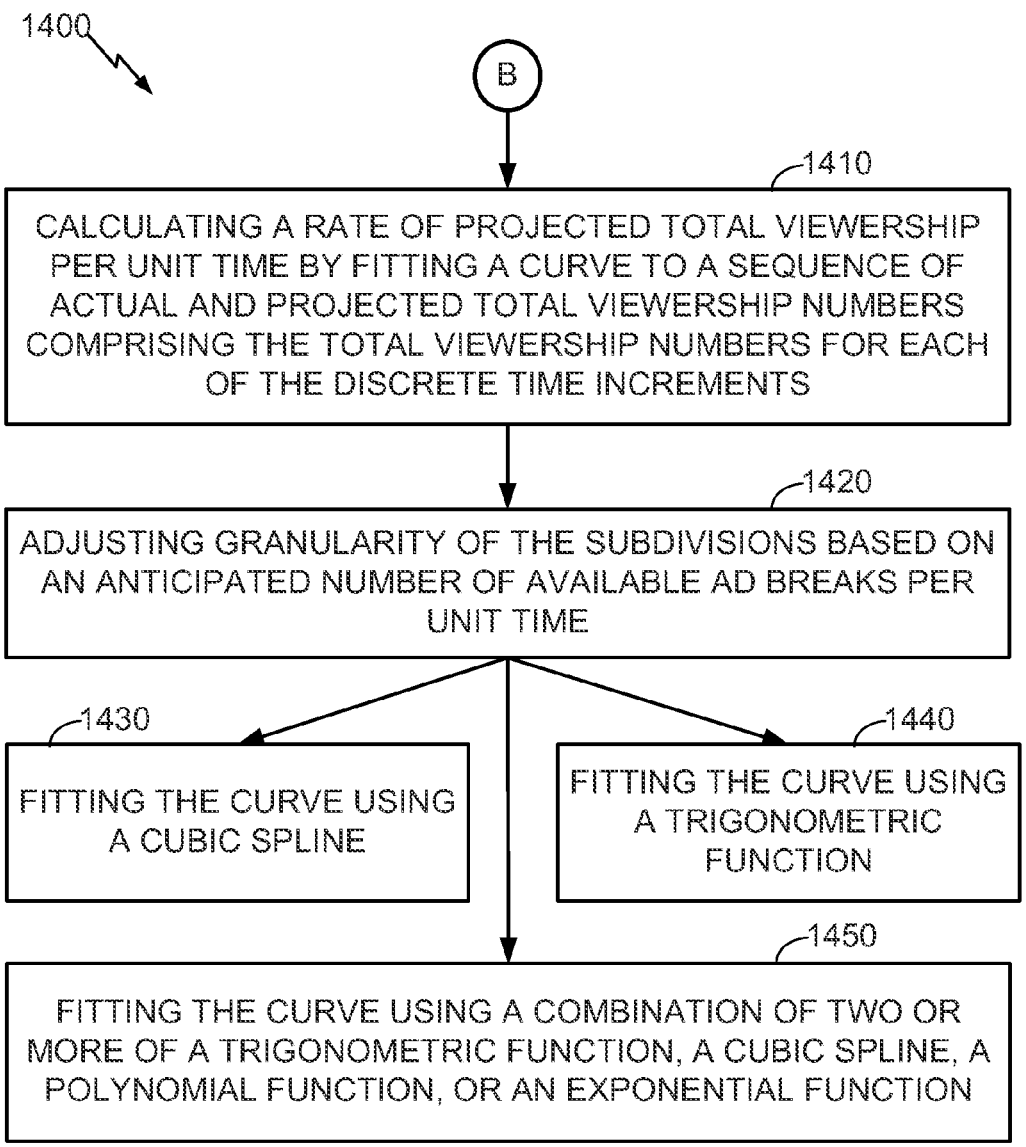

With reference to FIGS. 12-14, several additional operations 1200, 1300 and 1400 are depicted for managing the pacing of video ad delivery in an online video distribution system, which may be performed by a computer server, alone or in combination with a client device and/or another server. One or more of operations 1200, 1300 and 1400 may optionally be performed as part of method 1100. The elements 1200, 1300 and 1400 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1100 includes at least one of the operations 1200, 1300 and 1400, then the method 1100 may terminate after the at least one operation, without necessarily having to include any subsequent downstream operation(s) that may be illustrated.

In an aspect, with reference to FIG. 12, the method 1100 may further include additional operations 1200 for determining a pacing scheme used for allocating video ads in a streaming video system. The additional operations may include, at 1210, dividing the duration of the ad campaign into a sequence of discrete time increments. For example, the video ad server or module may divide an ad campaign extending over multiple dates and/or daily time periods into hourly increments covering those dates or daily time periods.

The method 1100 may further include, at 1220, allocating an equal number of the video advertisements to each of the discrete time increments. For example, video ad server or component may divide a total number of ads in the campaign by the number of hourly increments, or use a more sophisticated distribution method based on projected viewer numbers as disclosed herein. For example, the method 1100 may further include, at 1230, calculating a projected total viewership number for each of the discrete time increments. For example, the method 1100 may further include, at 1240, calculating the projected total viewership number for each of the discrete time increments based on factors comprising at least one of: identity of video programs included in the ad campaign, time-of-day, episode release date, viewership decay rate for past episodes, and viewership per new episode.

In other aspects, with reference to FIG. 13, the method 1100 may further include additional operations 1300 for further determining the pacing scheme. The additional operations may include, at 1310, allocating a variable number of the video advertisements to each of the discrete time increments in proportion to the projected total viewership number for each of the discrete time increments. For example, the ad server may multiply a ratio of total ads in the campaign to number of hours in the campaign (i.e., a flat ads-per-hour rate) by a ratio of projected viewers in an upcoming hour to an average hourly number of viewers for the campaign period. In an alternative, or in addition, the method 1100 may further include, at 1320, subdividing the discrete time increments into subdivisions. For example, the server may divide an hourly increment in 60-second, 5-second or 1-second subdivisions.

In addition, the method 1100 may further include, at 1330, allocating a variable number of the video advertisements to each of the subdivisions in proportion to a rate of projected total viewership per unit time integrated over the each respective subdivision. The server may adopt an allocation algorithm for each successive period as described in connection with FIGS. 9-10. For example, in some embodiments, the method 1100 may further include, at 1340, calculating a rate of projected total viewership per unit time by interpolating between total viewership numbers for adjoining ones of the discrete time increments. For example, the server may perform an interpolation between an actual ad impressions number and a projected ad impressions number as described in connection with FIG. 9 above.

With reference to FIG. 11, in alternative embodiments, the method 1100 may further include additional operations 1400 for determining the pacing scheme. The method 1100 may include, at 1410, calculating a rate of projected total viewership per unit time by fitting a curve to a sequence of actual and projected total viewership numbers comprising the total viewership number for each of the discrete time increments. For example, a curve fitting algorithm as described above in connection with FIG. 10 may be used. The method 1100 may further include, at 1420, adjusting granularity of the subdivisions based on an anticipated number of available ad breaks per unit time. For example, the granularity (e.g., 1-second, 5-second, 60-second, etc.) may be derived in proportion to the quotient of 3600 seconds (1 hour) and by the number of ad breaks expected per hour for the ad streaming system.

Curve fitting the rate of project total viewership (or a related number such as predicted ad impressions) may be performed using various curve-fitting algorithms. For example, the method 1100 may include, at 1430, fitting the curve using a cubic spline. In the alternative, or in addition, the method 1100 may include, at 1440, fitting the curve using a trigonometric function. In the alternative, or in addition, the method 1100 may include, at 1450, fitting the curve using a combination of two or more of a trigonometric function, a cubic spline, a polynomial function, or an exponential function.

Figure 15:
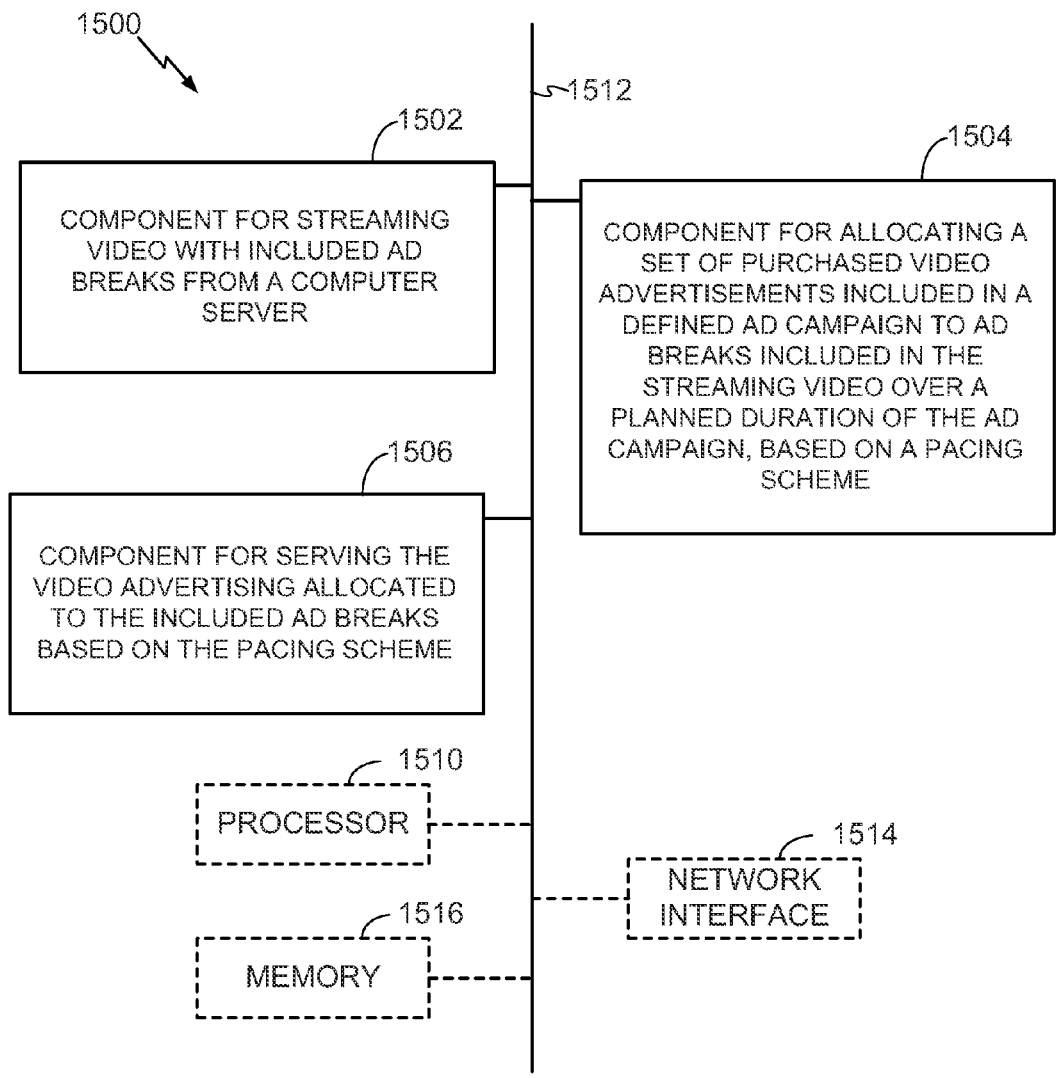
FIG. 15 is a diagram illustrating a computer server configured for managing the pacing of video ad delivery in an online video distribution system.

With reference to FIG. 15, there is provided an exemplary apparatus 1500 that may be configured as computer server or combination of computer servers, for managing the pacing of video ad delivery in an online video distribution system. The apparatus 1500 may include functional blocks that can represent functions implemented by a processor, software, or combination thereof (e.g., firmware).

As illustrated, in one embodiment, the apparatus 1500 may include an electrical component or means 1502 for streaming video with included ad breaks from a computer server. For example, the electrical component or means 1502 may include at least one control processor 1510 coupled to a memory component 1516. The control processor may operate an algorithm, which may be held as program instructions in the memory component. The algorithm may include, for example, setting up independently-controlled streaming sessions using respective addresses for client devices, and streaming video in the sessions based on control signals from the respective clients, using a streaming protocol as described herein in connection with FIG. 5.

The apparatus 1500 may further include an electrical component or module 1504 for allocating a set of purchased video advertisements included in a defined ad campaign to ad breaks included in the streaming video over a planned duration of the ad campaign, based on a pacing scheme. For example, the electrical component or means 1504 may include at least one control processor 1510 coupled to a memory component 1516. The control processor may operate an algorithm, which may be held as program instructions in the memory component. The algorithm may include, for example, one of the algorithms described herein in connection with FIGS. 9-10 and 12-14.

The apparatus 1500 may further include an electrical component or module 1506 for serving the video advertising allocated to the included ad breaks based on the pacing scheme. For example, the electrical component or means 1506 may include at least one control processor 1510 coupled to a memory component 1516. The control processor may operate an algorithm, which may be held as program instructions in the memory component. The algorithm may include, for example, including an allocated and selected ad in a streaming session initiated by the streaming component 1502.

The apparatus 1500 may include similar electrical components for performing any or all of the additional operations 1200, 1300 and 1400 described in connection with FIGS. 12-14, which for illustrative simplicity are not shown in FIG. 15.

In related aspects, the apparatus 1500 may optionally include a processor component 1510 having at least one processor, in the case of the apparatus 1500 configured as a network entity. The processor 1510, in such case may be in operative communication with the components 1502-1506 or similar components via a bus 1512 or similar communication coupling. The processor 1510 may effect initiation and scheduling of the processes or functions performed by electrical components 1502-1506.

In further related aspects, the apparatus 1500 may include a network interface component 1514 enabling communication between network nodes. The apparatus 1500 may optionally include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for implementing the processes and behavior of the components 1502-1506, and subcomponents thereof, or the processor 1510, or the methods disclosed herein. The memory component 1516 may retain instructions for executing functions associated with the components 1502-1506. While shown as being external to the memory 1516, it is to be understood that the components 1502-1506 can exist within the memory 1516.

It should be understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical discs or magnetic disks, such as used in a data storage device or medium. Volatile media may include dynamic memory, such as a main or cache memory for a computer processor. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, solid-state drive (SSD), or any other memory card, chip, or cartridge, or any other memory medium from which a computer can read.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
    dividing an ad campaign into a sequence of discrete time increments;
    determining a measured total viewership number for a set of prior discrete time increments in the sequence of discrete time increments;
    calculating a projected total viewership number for each of a set of future discrete time increments in the sequence of discrete time increments, the projected total viewership number being configured to vary for the set of future discrete time increments;
    determining a first total viewership number at a first point for a first discrete time increment and a second total viewership number at a second point for the first discrete time increment, wherein the first point is a beginning point of the first discrete time increment and the second point is an ending point of the first discrete time increment;
    adjusting a granularity of a number of subdivisions based on an anticipated number of available ad breaks per unit time;

subdividing the first discrete time increment in the set of future discrete time increments into the number of subdivisions;

fitting a curve to the measured total viewership per unit time for the set of prior discrete time increments and the projected total viewership number for each of the set of future discrete time increments based on the number of subdivisions, wherein the curve is scaled to fit to the first point and the second point in the first discrete time increment based on the number of subdivisions; and allocating a set of purchased video advertisements included in the ad campaign to ad breaks included in one or more streaming videos over the first discrete time increment at a rate using an advertisement pacing module configured to allocate video advertisements throughout the first discrete time increment based on the curve without a time gap of not being configured to allocate video advertisements at an end of the first discrete time increment after allocation of the set of purchased video advertisements for the second total viewership number is reached.

2. The method of claim 1, wherein dividing the ad campaign comprises dividing a duration of the ad campaign into the sequence of discrete time increments.

3. The method of claim 2, wherein the sequence of discrete time increments comprises a sequence of hour increments.

4. The method of claim 1, wherein fitting comprises fitting the curve using a cubic spline.

5. The method of claim 1, wherein fitting comprises fitting the curve using a trigonometric function.

6. An apparatus, comprising at least one processor configured for:

dividing an ad campaign into a sequence of discrete time increments;

determining a measured total viewership number for a set of prior discrete time increments in the sequence of discrete time increments;

calculating a projected total viewership number for each of a set of future discrete time increments in the sequence of discrete time increments, the projected total viewership number being configured to vary for the set of future discrete time increments;

determining a first total viewership number at a first point for a first discrete time increment and a second total viewership number at a second point for the first discrete time increment, wherein the first point is a beginning point of the first discrete time increment and the second point is an ending point of the first discrete time increment;

adjusting a granularity of a number of subdivisions based on an anticipated number of available ad breaks per unit time;

subdividing the first discrete time increment in the set of future discrete time increments into the number of subdivisions;

fitting a curve to the measured total viewership per unit time for the set of prior discrete time increments and the projected total viewership number for each of the set of future discrete time increments based on the number of subdivisions, wherein the curve is scaled to fit to the first point and the second point in the first discrete time increment based on the number of subdivisions; and allocating a set of purchased video advertisements included in the ad campaign to ad breaks included in one or more streaming videos over the first discrete time increment at a rate using an advertisement pacing module configured to allocate video advertisements throughout the first discrete time increment based on the curve without a time gap of not being configured to allocate video advertisements at an end of the first discrete time increment after allocation of the set of purchased video advertisements for the second total viewership number is reached; and a memory coupled to the at least one processor for storing data.

7. The apparatus of claim 6, wherein dividing the ad campaign comprises dividing a duration of the ad campaign into the sequence of discrete time increments.

8. The apparatus of claim 7, wherein the at least one processor is further configured for configuring the sequence of discrete time increments in hour increments.

9. A computer program product, comprising:

a non-transitory computer-readable medium holding coded instructions, that when executed by a processor, cause a computer to perform the operations of:

dividing an ad campaign into a sequence of discrete time increments;

determining a measured total viewership number for a set of prior discrete time increments in the sequence of discrete time increments;

calculating a projected total viewership number for each of a set of future discrete time increments in the sequence of discrete time increments, the projected total viewership number being configured to vary for the set of future discrete time increments;

determining a first total viewership number at a first point for a first discrete time increment and a second total viewership number at a second point for the first discrete time increment, wherein the first point is a beginning point of the first discrete time increment and the second point is an ending point of the first discrete time increment;

adjusting a granularity of a number of subdivisions based on an anticipated number of available ad breaks per unit time;

subdividing a first discrete time increment in the set of future discrete time increments into the number of subdivisions;

fitting a curve to the measured total viewership per unit time for the set of prior discrete time increments and the projected total viewership number for each of the set of future discrete time increments based on the number of subdivisions, wherein the curve is scaled to fit to the first point and the second point in the first discrete time increment based on the number of subdivisions; and allocating a set of purchased video advertisements included in the ad campaign to ad breaks included in one or more streaming videos over the first discrete time increment at a rate using an advertisement pacing module configured to allocate video advertisements throughout the first discrete time increment based on the curve without a time gap of not being configured to allocate video advertisements at an end of the first discrete time increment after allocation of the set of purchased video advertisements for the second total viewership number is reached.

10. The method of claim 1, wherein the second total viewership number is based on at least one projected viewership number allocated to the set of future discrete time increments.

11. The method of claim 1, further comprising sending the streaming video with included ad breaks from a computer server.

12. The method of claim 1, further comprising sending the video advertising allocated to the included ad breaks based on the rate.

13. The method of claim 1, wherein the measured total viewership numbers for the set of prior discrete time increments are measured at the granularity equal to one of the discrete time increments.

14. The method of claim 1, wherein the projected total viewership numbers for the set of future discrete time increments are determined at the granularity equal to one of the discrete time increments.

15. The apparatus of claim 6, wherein fitting comprises fitting the curve using a cubic spline.

16. The apparatus of claim 6, wherein fitting comprises fitting the curve using a trigonometric function.

17. The apparatus of claim 6, wherein the second total viewership number is based on at least one projected viewership number allocated to the set of future discrete time increments.

18. The apparatus of claim 6, further comprising sending the streaming video with included ad breaks from a computer server.

19. The apparatus of claim 6, further comprising sending the video advertising allocated to the included ad breaks based on the rate.

20. The apparatus of claim 6, wherein the measured total viewership numbers for the set of prior discrete time increments are measured at the granularity equal to one of the discrete time increments.

21. The apparatus of claim 6, wherein the projected total viewership numbers for the set of future discrete time increments are determined at the granularity equal to one of the discrete time increments.

* * * * *